May 10, 1949.　　　　J. R. BOWMAN ET AL　　　　2,469,628
CALCULATING MACHINE

Filed April 27, 1945　　　　　　　　　　　　　　5 Sheets-Sheet 1

Inventors
JOHN R. BOWMAN
RALPH T. STEINBACK

By　A. M. Houghton
　　　　　Attorney

May 10, 1949.   J. R. BOWMAN ET AL   2,469,628
CALCULATING MACHINE
Filed April 27, 1945   5 Sheets-Sheet 2

Inventors
JOHN R. BOWMAN
RALPH T. STEINBACK
By A. M. Houghton
Attorney

May 10, 1949.    J. R. BOWMAN ET AL    2,469,628
CALCULATING MACHINE

Filed April 27, 1945    5 Sheets-Sheet 3

Inventors
JOHN R. BOWMAN
RALPH T. STEINBACK

By A. M. Houghton
their Attorney

May 10, 1949.   J. R. BOWMAN ET AL   2,469,628
CALCULATING MACHINE
Filed April 27, 1945   5 Sheets-Sheet 4

FIG. 9.

Inventors
JOHN R. BOWMAN
RALPH T. STEINBACK
By A. M. Houghton
their Attorney

Patented May 10, 1949

2,469,628

UNITED STATES PATENT OFFICE 2,469,628

CALCULATING MACHINE

John R. Bowman and Ralph T. Steinback, Pittsburgh, Pa., assignors to Gulf Research & Development Company, Pittsburgh, Pa., a corporation of Delaware Application April 27, 1945, Serial No. 590,698

3 Claims. (Cl. 235—61)

This invention relates to calculating machines and more particularly to electronic calculating machines adapted for use in the solution of linear simultaneous algebraic equations.

In the prior and copending application Serial No. 479,790, filed March 19, 1943, by John R. Bowman on Calculating machines, there is disclosed and claimed an apparatus for an electronic calculating machine for use in the solution of linear simultaneous algebraic equations. The present application concerns an improved form of such apparatus and more particularly one which is simpler and has greater accuracy.

Solution of systems of linear algebraic equations is one of the most common operations of computation. Elementary methods of elimination or substitution are quite satisfactory for systems having not more than four variables. For larger systems, however, the calculations become extremely laborious, as the number of arithmetical operations required increases approximately as $n.n!$ for $n$ variables; exact solution of a system of 20 variables requires more than $10^{20}$ operations. Many years ago Gauss pointed out that any problem in computation can, theoretically, be reduced to solution of a linear system of equations which fact has subsequently from a practical standpoint been accepted as true. For large systems, except those with many terms missing, the simplest straightforward method available is that of Sylvester employing determinants, which is not readily adapted to a conventional keyboard calculating machine. Practically, systems of greater than five variables are nearly always solved by methods of successive approximations. These approximate methods are also laborious, and frequently do not give good accuracy; they are discussed at some length later. The numerical solution of systems of equations thus presents a problem requiring a special type of calculating machine.

Further, since in the past, solution of large systems of simultaneous equations was difficult or impossible, little attention was paid to the reduction of problems to such systems; doubtless the availability of a machine of the present type will stimulate interest in new transformations that will extend the use of the instrument beyond applications now obvious.

Several difficult mathematical operations are equivalent to solution of a linear algebraic system. One of these is the expansion of functions in series; with an $n$ variable device, $n$ terms are readily determined. Harmonic analysis is a special case of this, and would provide an excellent justification for the machine alone. Numerous devices have been built specifically for harmonic analysis, some of them very elaborate and none as potentially accurate as this device. Other useful expansions are series of powers, exponentials, error functions, spherical harmonics and Bessel functions. These operations are the best way of analyzing and generalizing empirical functional forms, and they occur very frequently in pure and applied physics.

The present device is also capable of integrating ordinary linear differential equations. Here, the given equation is regarded as a finite difference equation with the increments very small; $n$ points of the integral are obtained on a single pass through the instrument, and any number of passes may be made using the last point of the last set as the boundary point for the next set. Good accuracy is obtainable, since the intervals between the points can be made very small without incurring laborious calculation.

Linear integral equations can likewise be solved numerically. Repeated use of the machine will again increase the accuracy of the solution, but not as satisfactorily as in the case of differential equations because the $n$ points selected for the independent variable must necessarily cover the entire range of integration rather uniformly. However, if $n$ is about 15 or greater sufficient accuracy will be obtained for nearly all practical work. The application of the present machine in this connection is essentially a finite case of the well known Fredholm process; a more refined approximation, depending on the reduction of the equation to a linear system has been described recently, in Crout, J. Math. Phys., Mass. Inst. Tech., 19, 34 (1940). These applications are of particular interest at present because of the active modern interest in integral equations in many branches of science and engineering.

Correlation of data by the method of least squares always involves the solution of linear algebraic systems. This is a particularly important application, and will appear in nearly every type of experimental numerical work from surveying to psychology.

Numerical solutions of linear systems are of importance in a few highly theoretical lines of endeavor; good examples are in group theory in pure mathematics and in the calculation of wave functions by the Hartree method of quantum mechanics.

Electrical networks furnish a great class of practical problems of such importance that several specialized machines, more or less equivalent to the present device, have been built. The mathematical statement of these problems is directly in the form of linear algebraic equations, arising from the application of Kirchhoff's and Ohm's laws, and requires no reduction for solution by the present device.

Stress-strain problems in connection with structural units comprise an important division of mechanical and civil engineering. These lead, in the more complicated cases, to the determination of several unknowns in a linear system. Machines, dams, bridges, airplanes, and buildings are just a few examples of design problems where this device might help.

Step-wise countercurrent processes, as widely used in chemical engineering, are easily treated rigorously by the present type of machine. These include rectification, as in a bubble plate column, absorption, adsorption, extraction and chemical reaction processes.

Chemistry offers at least two general types of problems in which the device would be useful, equilibrium and kinetic calculations. The water-gas reaction is a good example of the first. Here, five components are mutually interconvertible through four reactions; if the equilibrium constants are known, as they are in this case, the equilibrium compositions may be calculated at any temperature by solution of a linear algebraic system. The inverse problem is also readily treated; if the compositions are known, the equilibrium constants can generally be calculated, even for rather complex systems. Kinetic calculations are formally similar. In these problems, one has to deal with reaction rates, and if the reaction rate constants are known, the progress of the reactions in a complex system can be followed with this device. Gas-phase combustion is an example of this type of problem.

The immediate response of the present device, and the ease with which the coefficients and constant terms may be adjusted permits its use for control work. Consider, for example, the use of the mass spectrograph as a gas analyzer for control of a still. Each component gives a spectrum of several peaks. The patterns for the different components are all different, but the peaks are more or less superimposed. By selection of $n$ suitable peaks, the composition of the gas with respect to $n$ components may be obtained continuously, and used for indication, control, or recording. More generally, any mixture may be analyzed by measurement of $n$ independent physical properties, and if these properties are linear functions of the compositions, the device will give the analysis continuously. Density, refractive index, vapor pressure, optical activity, and absorption spectrum are a few of the properties that might be used.

Only a few machines for solving systems of linear equations have been built in the past. The earliest successful one is a six-variable instrument described by Mallock; R. R. M. Mallock, Proc. Roy. Soc., A140, 457 (1933); which depends on the A.-C. flux in numerous small transformers having multiple coils. The principle of that machine is very simple, but the accuracy is poor, and becomes increasingly so as the number of variables is increased. Rather complicated compensating circuits are required to correct for the losses in the transformers. Mention is made in the original paper that the Cambridge Instrument Co. has built a machine of this type for ten variables, but no definite performance data are given for it.

The only other instrument designed strictly for the present application that has been fully described is that built at the Massachusetts Institute of Technology and described in detail by Wilbur, Jour. Franklin Inst., 222 715 (1936). This is a mechanical type for nine variables, depending for action on simple geometrical properties of levers. The accuracy reported is good, but the machine is difficult to set for a problem and considerable time is required for indication of the solution. The cost of this type is great; many small pulleys, levers, ball-bearings, steel bands and micrometer screws are required, and the machine takes up a considerable amount of space.

A "network analyzer" has been built by Westinghouse and described by Travers and Parker in The Electric Journal, page 3, (May 1930). This is a machine specifically designed for solving problems in electrical networks by a process which practically amounts to setting up of scale models of the circuits and measuring their performance. It is not strictly equivalent to the proposed type of machine, inasmuch as each equation must have only a limited number of terms, though the number of variables may be large. Furthermore, it is not suitable for solving problems given in the usual algebraic form, because the discovery of the network corresponding to the given problem is not a straightforward operation. The Westinghouse machine is a very large one; its control boards fill three walls of a room about 20 x 20 feet, and have about 8000 switches, several plug boards with hundreds of jacks, and numerous other controls. The makers built the machine for their own research use, not for commercial production.

None of the machines described could feasibly be adapted to solution of systems as large as the proposed one will solve, and the proposed one is superior to all with respect to speed, accuracy, cost and size.

Therefore, the primary object of this invention resides in the provision of a flexible electronic calculating machine that is adapted for solving systems of linear algebraic equations which include those of the types mentioned above.

More specifically, it is the object of the present invention to provide an electronic machine for determining the roots of $n$ variables related by $n$ linear algebraic equations, where $n$ is any integer greater than unity, comprising $n$ amplifiers giving an alternating current response to a direct current input, $n^2$ rectifiers supplying direct current, $n^2$ voltage dividers adjustable to be proportional to the coefficients of the system of equations, $n$ sources of direct current voltage adjustable to be proportional to the constant terms of the system of equations, these circuit units being connected in $n$ circuits, each traceable from ground through a voltage supply, through $n$ of the parts of the voltage dividers in series and into the amplifier, the input of which has a grounded return, each of the voltage dividers being supplied with current from one and only one of the rectifiers, and the output of the $m$th amplifier, where $m$ runs from one to $n$, so connected as to supply to the $m$th rectifiers of all the said circuits, and at least one of the said circuits being provided with current measuring devices in series with rectifiers giving indications that can be read as desired roots of the system of equations.

Another object of this invention is the improvement of the device described in co-pending application, Serial No. 479,970, which comprises the substitution of voltage dividers for adjustable resistors. The use of the voltage dividers removes the need for regulation of the current supplied to them so that the internal resistance of the current supplies need not be large. This permits the employment of simple rectifier circuits as current supplies in place of the more complex regulated current supply units required for the device described in the above-mentioned application.

Another object of this invention resides in the provision of electronic calculating machines which employ the principles of fully degenerative feedback.

Still another object of this invention resides in the provision of an electronic calculating machine adapted for use in solving a system of $n$ simultaneous algebraic equations having $n$ variables which will indicate directly and continuously the roots thereof.

This invention further contemplates the provision of an electronic calculating machine for the solution of systems of algebraic equations that is small, compact, economical to manufacture, and easy to operate.

Other objects and advantages of the present invention will become apparent from the following detailed description when considered with the drawings in which.

For the sake of clarity in understanding the Figures 1, 2 and 9, those circuits carrying D.-C. are shown by solid lines thus ——, circuits carrying A.-C. from amplifiers to rectifiers are shown by dotted lines thus -----, and circuits carrying A.-C. supply from an oscillator are shown by dot-dash lines thus —·—.

Figure 1:
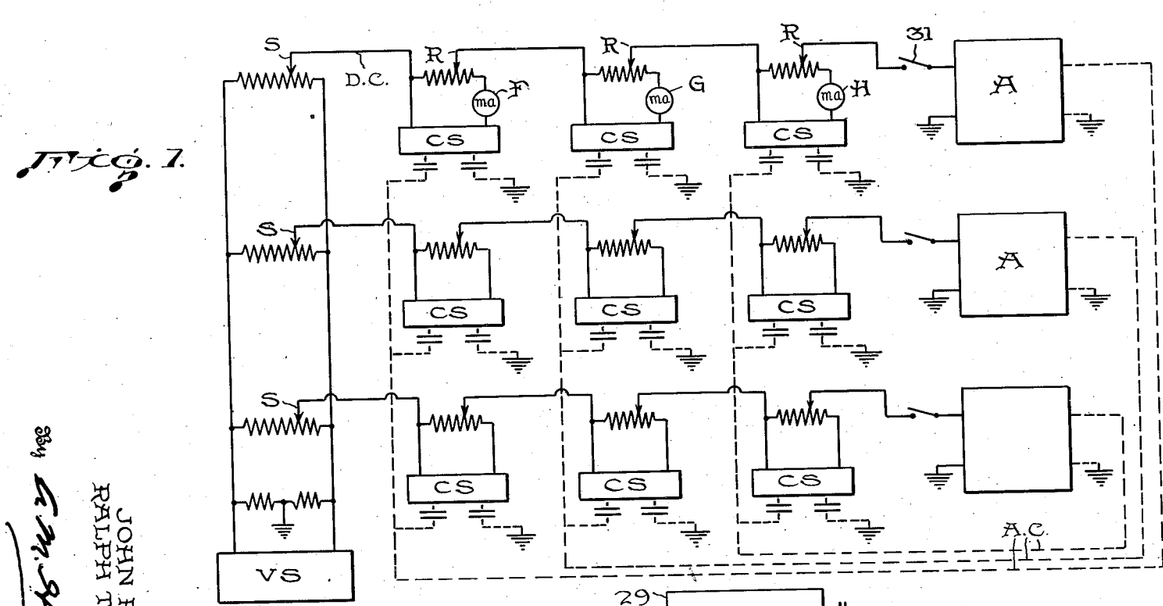
Figure 1 is a block diagram of a three-variable machine which serves to illustrate the principle of the invention which is directed to an $n$ variable machine.

Referring to the drawings in detail, particularly Figure 1, there is illustrated diagrammatically a machine disclosed in the aforementioned application Serial No. 479,790, useful for the purpose of solving linear simultaneous equations of three variables. The three-variable instrument is, of course, of little value other than to illustrate the basic principles of the machine. Three variable systems are readily solved in a few minutes by ordinary arithmetical processes. A three-variable machine is illustrated merely to demonstrate the construction and operation of a larger one which would handle problems not amenable to other treatment.

By way of explanation of the principles involved in the present invention:

Let a problem be given in or reduced to, the form $$k_i - a_{ij}x_j = 0. \qquad i, j, = 1, 2, \ldots, n$$

The proposed machine recognizes the constant terms ($k$'s) as voltages, the coefficients ($a$'s) as ohmic resistances, and the variable ($x$'s) as currents. Each equation is represented by a single circuit, beginning at a point on a voltage divider or potentiometer which may be voltage above or below ground, and having $n$ voltage dividers in series. Each voltage divider is provided with an independent, floating, D.-C. supply. These supplies will establish voltage drops across the adjustable part of the voltage divider which are proportional to the $ax$ terms. These voltage drops, since they are in series, will add, algebraically, to the reference voltage corresponding to the constant term to produce a voltage at the end of the circuit proportional to the value of the left side of the equation. If now, the $n_2$ current supplies can be made to supply currents such as the $m$th values are equal to $m$, and all of these latter voltages are zero, the roots may be read immediately by measurement of the currents and the system of equations is thereby solved.

Again referring to Figure 1, the current supplies CS comprise rectifiers which are designed to give an output of direct current, the magnitude of which is dependent on the A.-C. supplied them. All $n^2$ of them are identical. Since, when the given equations are reduced to the canonical form, the appearance of the variables in the $ax$ terms is such that one variable occurs alone in one column, and since the current outputs of the current supplies correspond to the variables, the output and hence the A.-C. supply voltages must be equal among all the rectifiers of any one column. Full degeneration in the amplifying system is accomplished by causing the sum voltages of the $n$ equations to generate the A.-C. source voltages for the rectifiers by columns respectively. Obviously, this arrangement will correct an error in any diagonal $ax$ term. If the $x$ in that term is too large or small, a signal is communicated to the amplifier connected to that equation circuit, which generates a change in the A.-C. voltage output of that amplifier, and that A.-C. voltage change is applied directly to the direct current supply corresponding to that $x$ in a manner to correct its value. These current supplies actuate the meters F, G and H which can be calibrated to read directly the roots of the three equations. Since the current supplies are all alike only one meter is required for each column. This principle of operation is disclosed in aforementioned application Serial No. 479,790.

Figure 3:
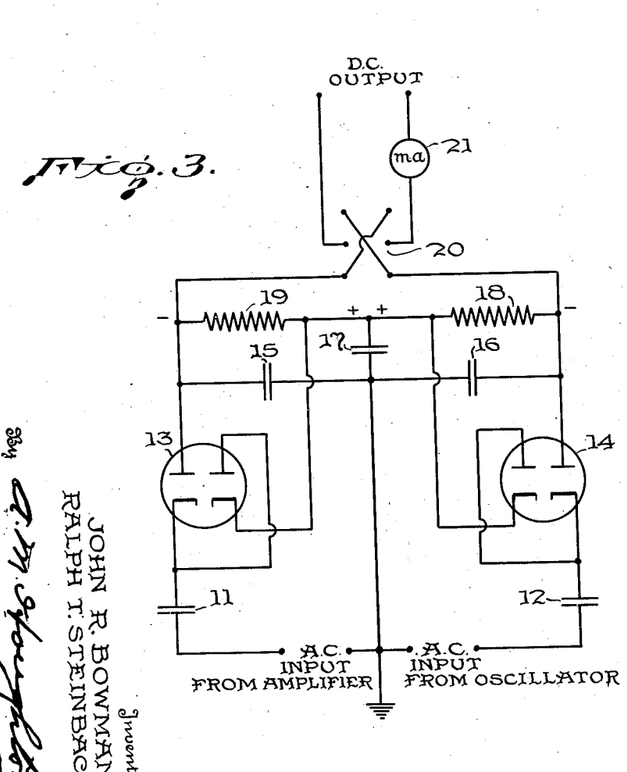
Figure 3 is a detailed wiring diagram of one of the $n_2$ rectifier units of the type used in the novel machine forming the subject matter of this application.

Discussing the elements of the machine separately, and in detail according to the embodiment of the present invention reference is made to the rectifier current supply units CS of Figure 1, one of which is shown in detail in Figure 3. It comprises essentially two double-rectifiers connected with their D.-C. outputs in opposition and their inputs separate except for a common condenser blocked ground return. The net D.-C. output voltage is therefore equal to the difference between peak voltages of the inputs. The output is provided with a plurality reversing switch 20 for selecting the sign of the coefficient when a problem is put into the machine. As shown diagrammatically in Figure 1, meters F, G, and H are placed in the current supply output leads. Such a meter is illustrated in Figure 3 at 21.

The type of rectifier circuit used is limited by the fact that the output must float with respect to D.-C. potentials from ground. This requires that all D.-C. voltages in the A.-C. supply must be blocked out either with condensers or transformers. If condensers are used, the rectifiers must be of the type that utilizes both half cycles of the A.-C. supply; thus a half wave voltage doubler can be used, but a simple half wave rectifier could not.

In the circuit of this invention, which will be described in more detail in connection with Figures 9 and 10, one of the A.-C. inputs to Figure 3 is supplied by a constant voltage A.-C. oscillator while the other is obtained from a suitable amplifier to be described later. The direct current output, representing an $x$ reverses when the amplifier voltage is equal to the oscillator voltage. This direct current varies linearly with the amplifier output but has a definite constant value even with no A.-C. input from the amplifier. The entire D.-C. circuit is free to float. Stability is excellent and there is some self-compensation for power line voltage fluctuation since this would effect both the oscillator and the amplifier in the same way.

Two rectifier tubes 13 and 14 are connected as indicated in Figure 3. These may be type 25Z6 or other type of double diode having independent cathodes. The heater circuits are not shown as they are of conventional form. Input condensers 11 and 12 are provided to isolate the circuit with respect to D. C. The double circuits are similar, the output of tube 13 being filtered by condensers 15 and 17 and resistor 19, and the output of tube 14 being filtered by condensers 16 and 17 and resistor 18. The output of the unit is therefore the difference between the D.-C. voltages developed across resistors 18 and 19. By using high values of resistance, the current drain is kept very small so that these voltages are essentially the peak A. C. impressed on the two halves of the input.

An important point is that the entire circuit for the current supply unit is isolated from all D.-C. potentials. Filament power is supplied through transformers and the A.-C. input circuits, both input and ground return, are blocked with condensers. The current output therefore floats and may assume any D.-C. potential required. In operation this may reach 900 volts when a three-variable instrument is unbalanced, or 300 volts when it is balanced.

Figures 4, 5:
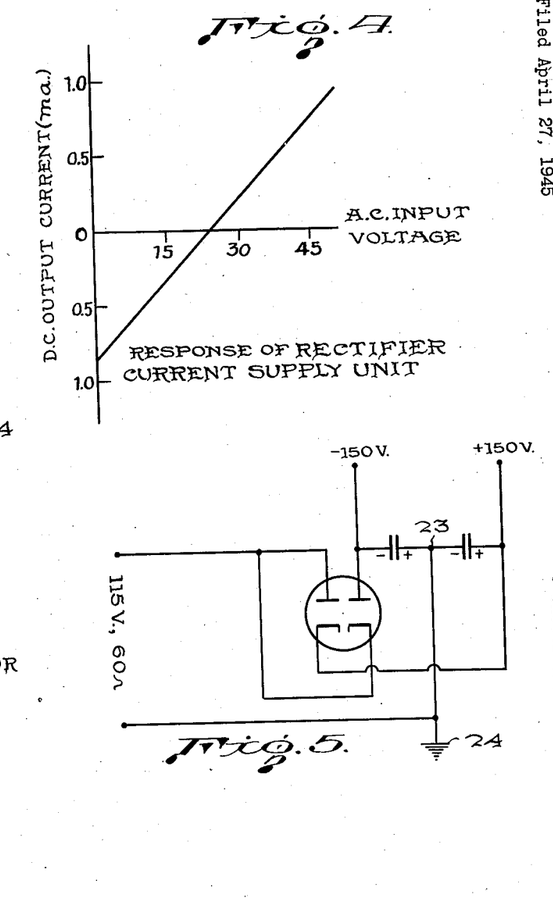
Figure 4 is a curve which has been plotted with direct current output as ordinates and A.-C. voltage input as abscissae representing the response of each of the rectifier current supply units.
Figure 5 is a detailed wiring diagram illustrating the circuit for one of the $n$ constant term voltage supplies.

Response curves which have been plotted with output current vs. A.-C. supply voltage are illustrated in Figure 4. It is apparent from Figure 1 that, if the amplifier input impedance is kept very high, the only load on the unit is merely that of the potentiometer R (Figure 1) which is constant and also quite high. Thus good stability is obtained. The response curve shown is by way of example only and may be changed to suit the particular machine, since the particular application of the machine controls the load involved.

The constant term voltage supply shown diagrammatically in Figure 1 is illustrated in Figure 5 and requires little description. A standard full wave doubler circuit is used which employs a type 117Z6 rectifier tube. The mid-point 23 of the doubler circuit is grounded at 24. The voltage dividers therefore yield outputs of −150 to +150 volts, on a linear scale, when a 60 cycle power supply of 115 volts is used. This unit is the only one of the entire circuit that is sensitive to line voltage fluctuation. A change in line voltage will effect the indicated roots by a proportional change in the constant terms. Therefore, for a precision instrument, these voltages must be stabilized.

Figure 2:
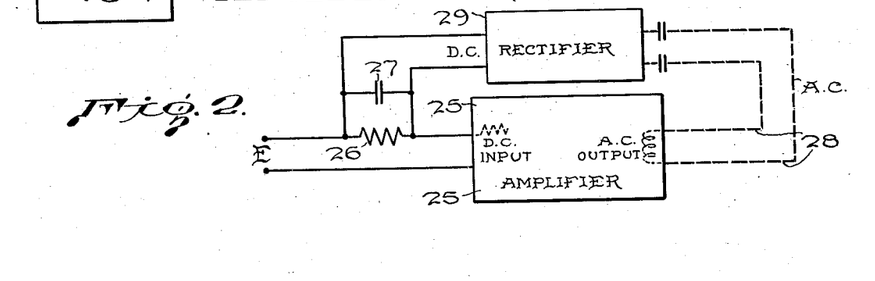
Figure 2 is a diagrammatic illustration of an amplifier illustrating the principles of fully degenerative feed-back in the simplest form used in this machine.

The amplifiers used in the present invention are of a special type which put out A. C. for a D.-C. input. The manner in which these amplifiers cooperate with the current supplies to yield the proper currents is by the use of a degenerative or negative feed-back circuit. This is best explained by consideration of the simplest circuit of that type, essentially one for the solution of a single equation with a single unknown by the system of this invention. That circuit is illustrated in Figure 2. An amplifier 25 is used which has a large input resistance, a large voltage gain, and a floating output. It is of a type which gives a large A.-C. output for a small D.-C. input. Ignoring the condenser 27 for the present, when a D.-C. voltage is applied across the points E, the amplifier 25 initially functions to give a larger A.-C. voltage across its output 28. This voltage is rectified by means of the rectifier 29, and the resulting D. C. is applied across a resistor 26 in series with the input of the amplifier 25 with polarity such that it tends to buck out the input voltage initially applied across the points E. The equilibrium position of the circuit is readily calculated quantitatively. The fundamental performance of the amplifying system may be stated:

$$\text{Gain} \times \text{Input} = \text{Output}$$

In this case, $$G(E-E_0) = E_0$$
or
$$E/E_0 = 1 + 1/G$$

Therefore, if the gain is large, any voltage applied at E is very nearly equal to and balanced out by the output voltage developed across the resistor 26, and the true input voltage to the amplifier remains very nearly zero.

It may be noted here that the balancing out of the applied voltage is independent of the value of the gain as long as the latter is large. Distortion and instability of the amplifier therefore have only minute effects on the performance of the circuit. Any intermediate transformations made in the amplifier network, such as in the present case the transformation to A. C. and back again to D. C. in the current supplies are of minor consequence only insofar as they may effect the gain G.

A circuit essentially similar to this one has been described by Vance, Rev. Sci. Inst., 7 489 (1936), for use as an electronic meter. For voltage measurement, a milliammeter is placed in the output circuit, and a precision resistor used to neutralize the input. The instrument is then almost wholly insensitive to line voltage fluctuation and drift in amplifier characteristics, and its accuracy is solely dependent on that of the meter and resistor, input voltages being calculated over a wide range by mere application of Ohm's law.

For measurement of current, the instrument is shunted with another precision resistor. The current gain is then accurately the ratio of the two resistors, while in the case of the voltmeter application, the input resistance is simply that of the amplifier used, which may be nearly infinite.

The quantitative discussion of the performance of the circuit given above concerns only static equilibrium. In operation, and in automatically adjusting itself, the dynamic performance is also important. The mathematical treatment of the dynamic performance of the degenerative circuits has been fairly well developed, and is very complex, as described by Nyquist, Bell Syst. Tech. Jour., 11, 126 (1932). The results of the analysis, however, are fairly simple for the present circuit. It may have a stable or unstable equilibrium point; in the latter case it oscillates. Oscillation may be suppressed or eliminated entirely by the addition of the condenser 27 of Figure 2, and when this is done, the stable equilibrium state is the same as the one reached by simple calculation of static conditions.

The matter of stability of the computing machine herein described has been investigated theoretically. The general condition for stability of feed-back circuits is derived by Nyquist, Bell Syst. Tech. Jour., 11, 126 (1932). Consider an amplifier of gain G provided with a feed-back network (in this instance the rectifier current supply) with gain B. The quantities G and B will in general be complex, because either or both the amplifier and the feed-back network may introduce phase shift, and they may vary with the frequency. If all possible values of the product GB and its conjugate (for all frequencies) are considered, it is found that the system will oscillate if the over-all in-phase gain in unity. This gives definite specifications for the amplifiers used. The feed-back network (viz. rectifier) is purely resistive so that B is a real number, and therefore the amplifiers must be so designed that their gain is less than 1/B for those frequencies at which the input and output are in phase. This is readily achieved by using high frequency by-pass filters in the input circuits of the amplifiers, and designing the amplifiers themselves for low response at high frequencies.

The factor B is also under control though it is inherently fixed by the coefficients controlling the resistors for a given system of equations. Its value is under control in that it depends on the order in which the equations are written and on the order of the variables in the equations. A convenient sufficient condition for stability (assuming that the amplifier meets the above-mentioned requirement) is that B be negative. This condition is also very nearly necessary because it must be always less than 1/G when both B and G are real, and G is usually a large number. This reduces to the simple rule that a system of equations can give a stable solution in the machine if the matrix of the coefficients is such that all diagonal minors have the same sign. This rule concerns the stability of the machine once the solution has been attained. Nearly all systems of equations met in practice fulfill this condition or may be transformed to ones that do by writing them so that the largest coefficients lie on the diagonal of the matrix.

A more complete study involves also the dynamic manner in which the machine approaches the solution equilibrium state. This involves a solution of the general differential equations for the dynamic action of a machine for $n$ variables. The system of differential equations is linear and may be solved. The resulting criterion is that the machine will solve any system of equations for which the real parts of the roots of the characteristic equation of the matrix of coefficients are positive. Equations not satisfying this condition can always be transformed into ones that do satisfy it. See paper by W. V. Parker on "The limits to the characteristic roots of a matrix," Duke Math. J., 10, 479–482 (1943). The transformation can usually be determined by inspection. Upon introducing such a system of equations into the machine one is assured of a stable solution.

The amplifiers used in the machine are of a rather special type. They must respond to a D.-C. input of low voltage and supply an A.-C. output. In this case the high gain implies that for a small D.-C. input they must supply a very large A.-C. output. Linearity and distortion are wholly unimportant. Furthermore, they must show zero output when the input signal is negative, and a large gain as the signal goes slightly positive. Finally the drift of the zero point must be made very small. The rectifiers may be regarded as parallel output stages of the amplifiers.

Figures 6, 7:
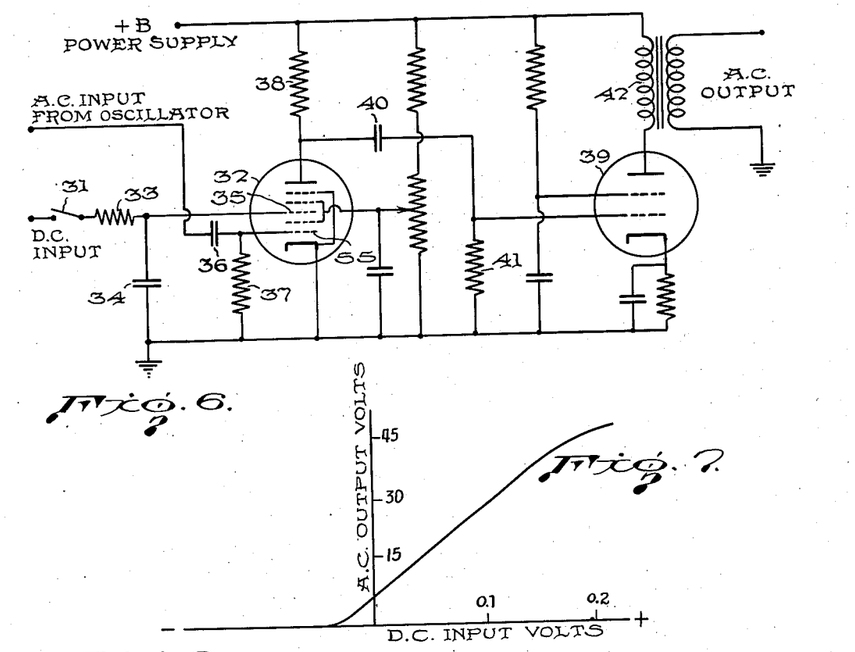
Figure 6 is a detailed circuit diagram of one of the $n$ amplifier units.
Figure 7 is a curve that has been plotted with root-mean square A.-C. output voltage as ordinates and D.-C. input voltage as abscissae which illustrates the response to one of the amplifier units.
Figure 9:
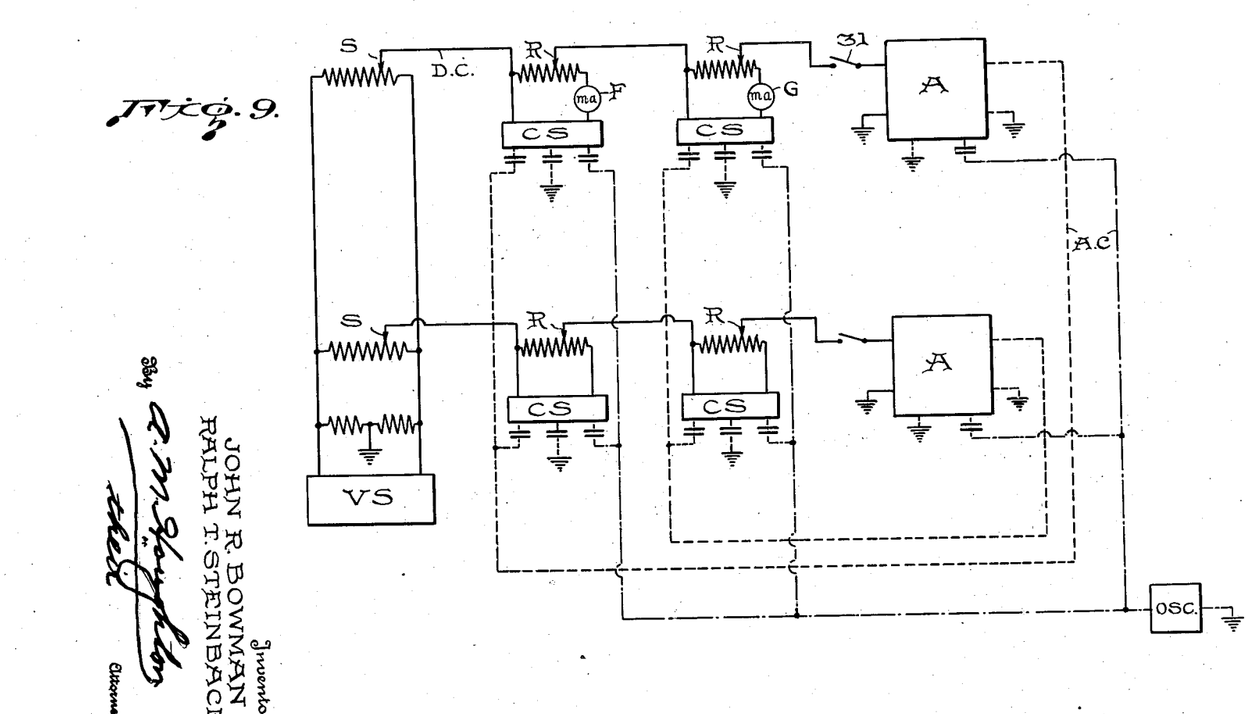
Figure 9 is a block diagram of a two variable machine constructed according to the present invention and showing in detail the connections to the A.-C. oscillator.

All this has been accomplished in the present invention by the circuit given in Figure 6, which is a detailed circuit of an amplifier unit marked A in Figures 1 and 9. Starting with the switch 31 (also shown in Figure 1), the D.-C. input is to one of the signal grids 35 of a mixer tube 32, such as a type 6L7. An input filter is provided by resistor 33 and condenser 34. Another signal grid 55 is supplied with A. C. from an oscillator through a coupling device consisting of condenser 36 and grid resistor 37. The other connections to tube 32 are in a conventional resistance coupled amplifier, except that the load resistance 38 is very large (250,000 ohms) and the voltage on the screen grids very small (about +5 volts).

Tube 32 develops across its plate resistor 38 an A.-C. potential which is proportional to the D.-C. input within certain limits. This A. C. is further amplified by means of a power tube 39, which may be a type 6L6. Conventional resistance coupling is provided by condenser 40 and resistor 41. Other connections to tube 39 are conventional. Output is obtained through transformer 42.

In operation the output of tube 32 consists of A. C. regulated by the D.-C. input voltage. The tube cuts off sharply when the input D. C. goes only slightly negative (about 0.5 volt). The zero point is characteristic of the tube and is stable within a small range. A typical response curve for one of the amplifiers is shown in Figure 7, this being by way of example only since it may vary depending on the size of the machine and the number of current supplies to be connected to the amplifier output.

Figure 8:
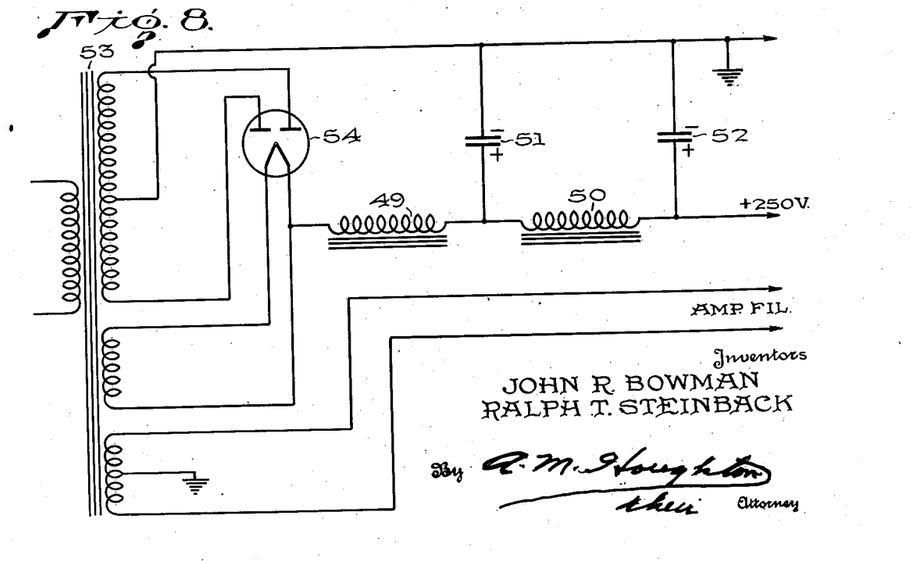
Figure 8 is a wiring diagram representing the power supply for the amplifiers.

The amplifiers are operated from a common power supply shown in detail in Figure 8. Since this unit has no unusual features except that the filtering as provided by the network shown comprising the iron core inductances 49 and 50 and the condensers 51 and 52 is preferred for such circuits. This better than usual filtering is necessary because any ripple remaining will appear as A.-C. output voltage from the amplifiers even when the input is negative, and this will reduce the effective range of the current supplies. In this figure the source of supply is shown as 110 volts A. C. and is impressed across the primary winding of a transformer 53 whose secondary is divided into a plurality of windings for supplying the amplifier filaments, the heater voltage for the rectifier tube 54, and the power supply to the rectifier tube.

Figure 10:
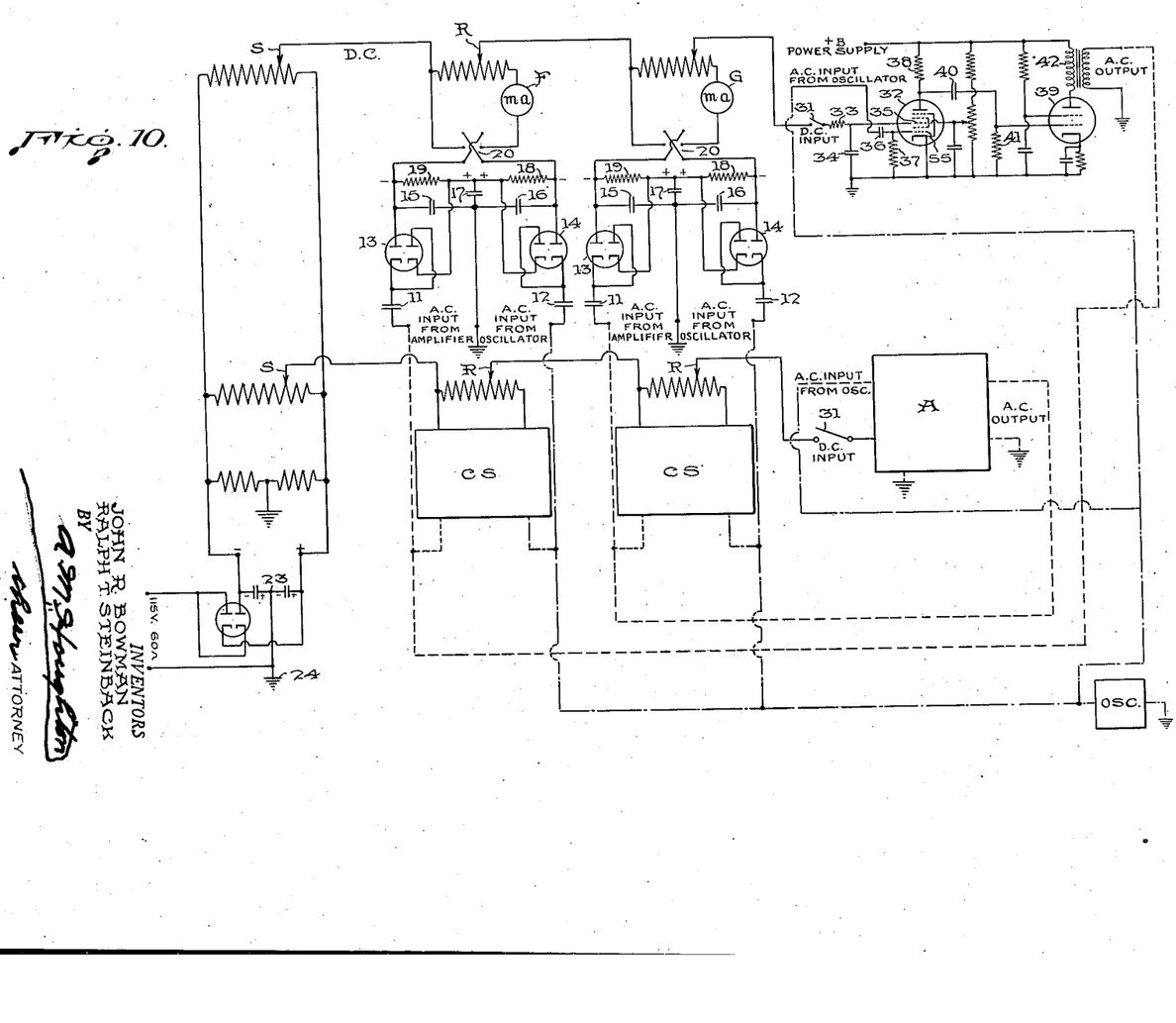
Figure 10 is a wiring diagram of a two variable machine of Figure 9 and shows in detail the wiring of one equation circuit.

In Figures 9 and 10 we have shown for a two variable machine constructed according to the present invention detailed connections including those by which A. C. is supplied to the various units by the oscillator. The oscillator OSC may be any conventional oscillator having sufficient power to adequately supply all of the current supplies CS and all of the amplifiers A. Its frequency is not important; we have found that a frequency of 1000 C. P. S. is advantageous. Other elements of Figure 9 have the same designation as previously explained. Figure 10 shows in detail the wiring for one equation circuit, i. e. the top row. The other equation circuits or rows are similarly connected. Filament heater and plate supply power are supplied to all units in a conventional manner and for simplicity these circuits are not shown. The circuit of Figures 9 and 10 may be extended to a machine of any number of variables in an obvious manner, the two variable machines being shown only for simplicity of illustration.

In operation, to set the machine for a problem involving a system of simultaneous algebraic equations of $n$ variables, an instrument having at least $n$ elements is used. The $n^2$ coefficients are set by means of the variable voltage dividers R illustrated in Figures 1 and 9 and the $n$ constant terms are set by means of the dividers S on directly calibrated dials. The roots of the equations are then read on the small meters such as those shown at F, G and H, in the three-element machine illustrated in Figure 1, or F and G on the two element machine of Figure 9, continuously and essentially instantaneously.

It is frequently convenient to make transformations on given systems of equations before setting them in the machine for solving. For example; if one column of coefficients are all relatively small, and the variable associated with that column is known to be large, these coefficients may be increased by the same factor. A similar treatment may be used when one column of coefficients is relatively large.

The results of action of the machine need not necessarily be indicated on the meters as the output can be used for recording and/or control, as well as for indication.

The instant invention is sufficiently flexible that it may also be used for practicing Jacobi's method for the solution of systems of algebraic equations. Jacobi proposed a method similar to that of Gauss and Seidel and mathematically equivalent to it. In the use of his method, corrected values of the assumed roots are sought, rather than the explicit corrections. This method, however, has received little attention from calculators.

One may write the given system of equations in the form $$a_{ij}x_j = k_i$$

Then assumed values are substituted for the $x$'s in the left side; a knowledge of the approximate values of the roots is of considerable help. The value of $x_1$ is now adjusted so that the first equation is satisfied; this is readily done, as it amounts merely to solving the first equation regarded as a single linear equation in one unknown. The value of $x_1$ so found is now substituted in all the equations, replacing the assumed value. Similarly now, the second equation is solved for $x_2$, and the value so found substituted in all the equations. When this value is substituted in the first equation, that one will, in general, no longer be satisfied, but the second one will. The process is then continued through the $n$ variables, solving the $i$th equation for $x_i$ in sequence, and substituting in the entire system the values found. When the process has been completed through the entire set of variables, the set of values in effect can be regarded as the first approximation to the roots comprising the solution. The entire process may then be repeated any number of times, obtaining a better approximation each time if the conditions for convergence are satisfied.

The convergence of the sequence of approximations so obtained has not been investigated rigorously, but undoubtedly could be along the lines disclosed by Schmidt in Phil. Mag., 32, 369 (1941). However, R. C. Briant of the Mellon Institute, Pittsburgh, Pa., has demonstrated the simple sufficient condition $$a_{ii} > a_{jk} \qquad i, j, k, = 1, 2 \ldots n \\ j \neq k$$

Any system may be reduced to this canonical form by rearrangement of the sequence of the variables and equations, and by a few simple additions or subtractions of the equations.

The mechanism of operation of the machine of the instant invention can be made similar to the latter method. The value of the $q$th variable is adjusted to satisfy the $q$th equation. The difference, however, is that in Jacobi's method the adjustment is made on one variable at a time in turn, while the present device performs all adjustments simultaneously.

If the simultaneous adjustment of the variables does not lead to the correct solution, a slight alteration of the machine will permit it to function exactly as in Jacobi's method. All that is necessary is to provide the amplifier input lines with switches 31 as shown in Figures 1 and 6, and a large condenser 34 to ground as shown in Figure 6. Starting with all the switches open; they would then be closed momentarily one at a time in turn; a motor-driven commutator, not shown, could be used to do the switching automatically. At each closing of a switch one equation would be satisfied by adjustment of the variable in its diagonal term, and a new and better approximation would be obtained for each complete cycle of switching. Since the response of the amplifiers is nearly instantaneous, very rapid switching could be used and a high order approximation obtained in a fraction of a second. The machine would, thus, still give continuous indication. The commutator can be replaced with an electronic switching device, such as a special type of multivibrator circuit, so that the instrument would have no moving parts.

Although a three-element machine (Figure 1) has been briefly described in this application to illustrate, in part, the principles and operation of one form of calculating machine of which the instant invention is an improvement and a two-element machine (Figure 9) is shown to illustrate in more detail a form of the present invention, it is to be understood that this matter is not to be construed as limiting the invention to a machine for the solution of a system of three or less simultaneous equations, but the invention contemplates electronic calculating machines adapted for use in solving a system of simultaneous algebraic equations for any number of variables up to $n$ and machines may be built for any value of $n$.

The principle of employing fully degenerative feed-back for balancing electronic calculating machines in general as described above and in aforementioned application Serial No. 479,790 has broad application and it is to be understood that the applicant is not to be limited by the specific application of this principle as described above. As an additional example of the application of fully degenerative feed-back for balancing electronic calculating machines, it can be employed in machines for drawing integral solution curves, starting from any boundary point, of the general order of differential equations of the first order. Numerous other examples of the use of fully degenerative feed-back might be postulated. Broadly speaking, it provides the only convenient and general means for balancing an equation electrically; it is the electrical equivalent of the mathematician's equal sign. Since all of the usual elementary operations of mathematics can be performed electrically, it is possible to build a machine for solving any system of equations by using such negative feed-back.

What we claim as our invention is:

1. An electronic computing device for determining the roots of a system of simultaneous linear algebraic equations with $n$ variables where $n$ is any positive integer greater than unity comprising in combination $n$ electronic amplifiers capable of supplying a large A.-C. for a small D.-C. input, $n$ D.-C. voltage sources each adjustable to produce a voltage proportional to the respective constant terms of the system of equations, and $n^2$ rectifiers each respectively supplying D. C. to the entirety of one of $n^2$ potentiometers whose adjustable portions are respectively made proportional to the coefficients of the system of equations, an electrical network involving the aforesaid elements in such a way so that one of said adjusted voltage sources and $n$ adjusted potentiometer portions all corresponding to one equation and one amplifier input are in series and so that the rectifiers supplying current to each of said $n$ series-connected potentiometer portions are respectively fed from the output of a different one of said amplifiers, and current-responsive devices in at least one of said rectifier circuits for indicating the desired roots of the equations.

2. An electrical computing device for determining the roots of a system of simultaneous linear algebraic equations with $n$ variables where $n$ is any positive integer greater than unity comprising in combination a source of alternating current, $n$ amplifiers connected to said A.-C. source and adapted to regulate A. C. obtained from said source in response to a small D.-C. amplifier input, $n$ D.-C. voltage sources each adjustable to produce a voltage proportional to the respective constant terms of the system of equations, $n^2$ rectifiers respectively connected to and supplying D. C. to one of $n^2$ adjustable potentiometers whose adjustable portions are respectively made proportional to the coefficients of the system of equations, an electrical network involving the aforesaid elements in such a way so that one of said adjusted voltage sources and $n$ of said adjusted potentiometer portions and one amplifier input are in series and so that the rectifiers supplying current to said $n$ series-connected potentiometer portions are respectively fed A. C. from one of said amplifiers, and current-responsive means in at least one of said potentiometer circuits for indicating the desired roots of the equations.

3. An electronic computing device for determining the roots of a system of simultaneous linear algebraic equations with $n$ variables where $n$ is an integer greater than unity comprising in combination an electronic oscillator, $n$ electronic amplifiers connected to said oscillator and adapted to regulate A. C. obtained from the oscillator in response to a small D.-C. amplifier input, $n$ D.-C. voltage sources each adjustable to produce a voltage proportional to the respective constant terms of the system of equations, $n^2$ pairs of full-wave rectifiers whose outputs are connected in series one of each pair being supplied with A. C. from the aforesaid oscillator and the other of each pair being supplied with regulated A. C. from one of the aforesaid amplifiers and the D. C. of the series-connected outputs being applied respectively to the entirety of one of $n^2$ potentiometers whose adjustable portions are respectively made proportional to the coefficients of the system of equations, an electrical network involving the aforesaid elements in such a way so that one of said adjusted voltage sources and $n$ adjusted potentiometer portions all corresponding to one equation and one amplifier input are in series and so that the rectifiers supplying current to said $n$ series-connected potentiometers are respectively fed from the output of a different one of said amplifiers, and current-responsive devices in at least one of said rectifier circuits for indicating the desired roots of the equations.

JOHN R. BOWMAN.
RALPH T. STEINBACK.

REFERENCES CITED

The following references are of record in the file of this patent:

UNITED STATES PATENTS

| Number | Name | Date |
|---|---|---|
| 1,893,009 | Ward | Jan. 3, 1933 |
| 2,417,098 | Wilcox | Mar. 11, 1947 |
| 2,454,549 | Brown | Nov. 23, 1948 |
| 2,455,974 | Brown | Dec. 14, 1948 |
| 2,458,697 | Fenske | Jan. 11, 1949 |
| 2,459,106 | Hardy | Jan. 11, 1949 |